United States Patent
Liu et al.

(10) Patent No.: US 11,442,732 B2
(45) Date of Patent: Sep. 13, 2022

(54) PROCESSOR AND INSTRUCTION EXECUTION METHOD

(71) Applicant: ALIBABA GROUP HOLDING LIMITED, Grand Cayman (KY)

(72) Inventors: Chang Liu, Shanghai (CN); Dongqi Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 50 days.

(21) Appl. No.: 16/786,191

(22) Filed: Feb. 10, 2020

(65) Prior Publication Data
US 2020/0257533 A1    Aug. 13, 2020

(30) Foreign Application Priority Data
Feb. 12, 2019    (CN) .......................... 201910111338.7

(51) Int. Cl.
*G06F 21/57*    (2013.01)
*G06F 21/44*    (2013.01)
*G06F 9/30*    (2018.01)
*G06F 9/38*    (2018.01)

(52) U.S. Cl.
CPC ...... *G06F 9/30145* (2013.01); *G06F 9/30134* (2013.01); *G06F 9/3802* (2013.01)

(58) Field of Classification Search
None
See application file for complete search history.

(56) References Cited

U.S. PATENT DOCUMENTS

| 10,453,017 | B1 * | 10/2019 | Richards | G06F 16/285 |
| 10,699,015 | B1 * | 6/2020 | Liu | G06F 12/1441 |
| 10,884,830 | B1 * | 1/2021 | Liu | G06F 12/0223 |
| 2009/0240923 | A1 * | 9/2009 | Covey | G06F 9/30076 |
| | | | | 712/220 |

(Continued)

OTHER PUBLICATIONS

PCT International Search Report and Written Opinion dated May 11, 2020, issued in corresponding International Application No. PCT/US2020/017501 (12 pgs.).

*Primary Examiner* — Hyun Nam
(74) *Attorney, Agent, or Firm* — Finnegan, Henderson, Farabow, Garrett & Dunner, LLP

(57) ABSTRACT

A processor comprises a trusted execution environment and a non-trusted execution environment. The processor further comprises a common resource accessible in both the trusted execution environment and the non-trusted execution environment and an instruction processing device including circuitry configured to fetch an instruction for decoding and execute the decoded instruction. The instruction processing device includes circuitry further configured to determine consistency between a current execution environment of the processor and a resource status in response to a result from instruction decoding indicating that instruction involves access to the common resource, and load content corresponding to the current execution environment into the common resource in response to a determination that the current execution environment is inconsistent with the resource status, wherein the resource status indicates an execution environment corresponding to content in the common resource. A corresponding instruction execution method in the processor is also disclosed.

28 Claims, 4 Drawing Sheets

(56) References Cited

U.S. PATENT DOCUMENTS

| | | | |
|---|---|---|---|
| 2014/0250290 A1* | 9/2014 | Stahl | G06F 9/4401 |
| | | | 713/2 |
| 2014/0283006 A1* | 9/2014 | Korkishko | G06F 21/53 |
| | | | 726/16 |
| 2015/0121516 A1* | 4/2015 | Korkishko | G06F 21/31 |
| | | | 726/19 |
| 2017/0083724 A1 | 3/2017 | Chhabra et al. | |
| 2018/0373895 A9 | 12/2018 | Durham et al. | |
| 2019/0073477 A1* | 3/2019 | Cui | G06F 9/545 |
| 2020/0125772 A1* | 4/2020 | Volos | H04L 9/30 |
| 2020/0310808 A1* | 10/2020 | Chen | G06F 9/30101 |

* cited by examiner

PROCESSOR AND INSTRUCTION EXECUTION METHOD

CROSS REFERENCE TO RELATED APPLICATION

This disclosure claims the benefits of priority to Chinese application number 201910111338.7, filed Feb. 12, 2019, which is incorporated herein by reference in its entirety.

BACKGROUND

In the fields of mobile Internet and Internet of Things, to improve security, a trusted world status is added as an operating mode of a processor. The trusted world status can be used to identify processors in a trusted world, system IPs with trusted attributes, and other sensitive and important software/hardware resources in a system. Resources in the trusted world are only accessible to members in the trusted world through hardware mechanisms, hence providing isolation between the trusted world and a non-trusted world and guaranteeing the confidentiality and integrity of the resources.

SUMMARY

According to some embodiments of the present disclosure, a processor is provided, having a trusted execution environment and a non-trusted execution environment, and comprising: a common resource accessible in both the trusted execution environment and the non-trusted execution environment; and an instruction processing device adapted to fetch an instruction for decoding and execute the decoded instruction. The instruction processing device further comprises a delay switching unit adapted to judge consistency between a current execution environment of the processor and a resource status when the result from instruction decoding indicates that the instruction involves access to the common resource, and load content corresponding to the current execution environment into the common resource if it is judged that the current execution environment is inconsistent with the resource status, wherein the resource status indicates an execution environment corresponding to content in the common resource.

According to some embodiments of the present disclosure, an instruction execution method in a processor is provided. The processor has a trusted execution environment and a non-trusted execution environment, and comprises a common resource accessible in all execution environments. The method comprises steps of: fetching and decoding an instruction; judging consistency between a current execution environment of the processor and a resource status if the result from instruction decoding indicates that the instruction involves access to the common resource, wherein the resource status indicates an execution environment corresponding to content in the common resource; loading content corresponding to the current execution environment into the common resource if it is judged that the current execution environment is inconsistent with the resource status; and executing the instruction.

DETAILED DESCRIPTION

To make the objectives, technical solutions and advantages of the embodiments of the present disclosure clearer, the technical solutions in the embodiments of the present disclosure are described below with reference to the accompanying drawings in the embodiments of the present disclosure. Obviously, the described embodiments are merely some rather than all of the embodiments of the present disclosure. Based on the embodiments in the present disclosure, all other embodiments obtained by those with ordinary skill in the art without creative efforts should fall within the protective scope of the present disclosure.

Existing ways to isolate resources include using two copies of the resources, one in the trusted world and one in the non-trusted world. Having two copies of the resources, however, can be wasteful for memory storage. As a result, there can be a common resource shared by the trusted world and the non-trusted world.

When processors switch between the trusted world and the untrusted world, the common resource generally needs to be stored and cleared. If the common resource is not used after the switching, the storing and clearing operations are unnecessary, and the speed of the switching is reduced. This is especially an issue with interrupts that have high time requirements.

As a result, there is a demand for a new processor instruction execution solution, which can realize more flexible access to the common resource for accelerating response speed during switching.

According to the embodiments of the present disclosure, when execution environment switching is performed in the processor, a common resource is not stored at the same time; instead, the switching of the common resource is started only when it is found during the execution of an instruction that the instruction involves access to the common resource. As such, the speed of switching the execution environment can be accelerated by delaying the switching time of the common resource.

In addition, according to the embodiments of the present disclosure, a resource status flag indicating an execution environment of a current common resource is introduced. As such, when an instruction involving access to the common resource is executed, whether to switch the common resource can be determined according to whether a current execution environment flag is consistent with the resource status flag, thus providing a convenient common resource switching solution.

Figure 1:
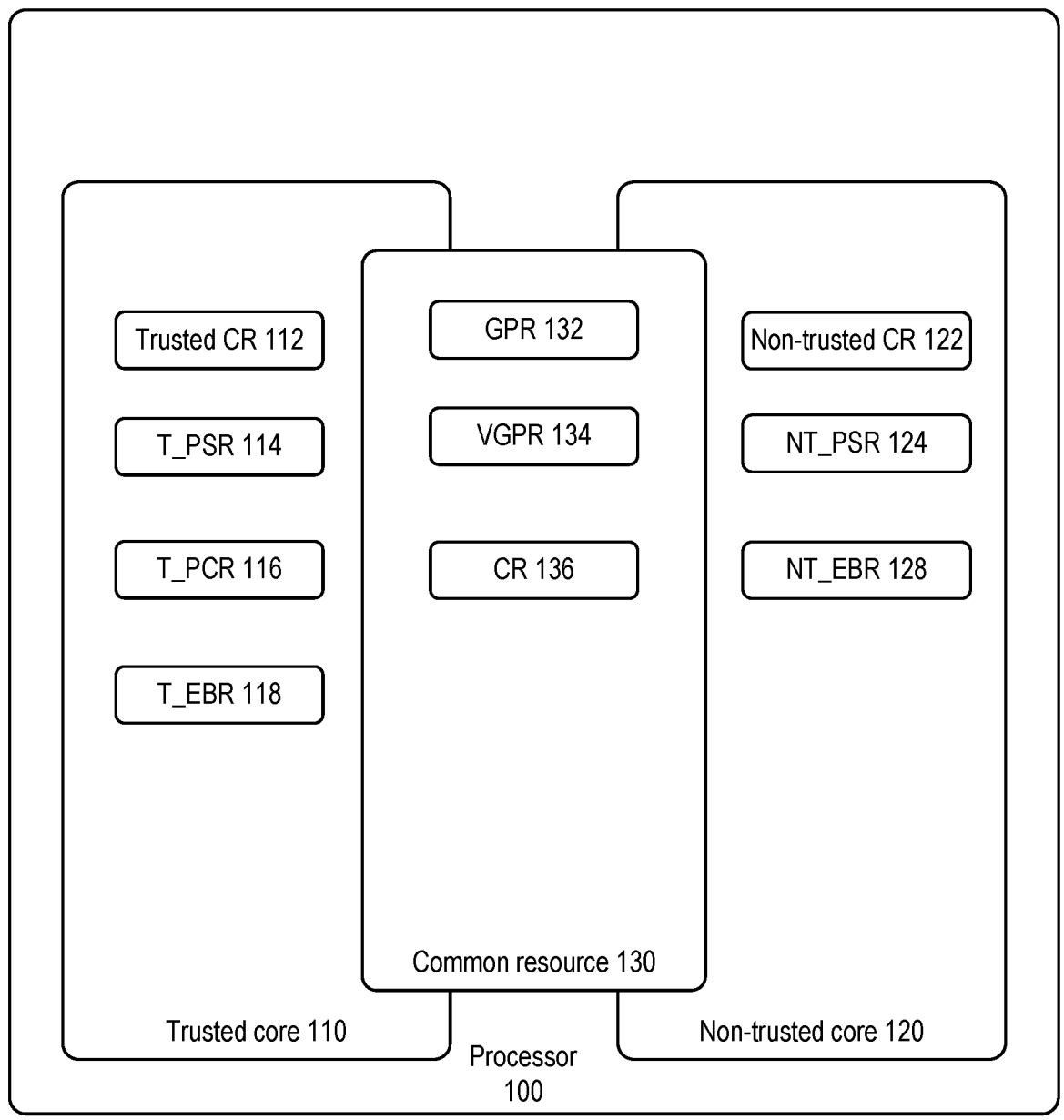
FIG. 1 is a schematic diagram of an example processor, according to some embodiments of the present disclosure.

FIG. 1 is a schematic diagram of an example processor, according to some embodiments of the present disclosure. As shown in FIG. 1, processor 100 comprises a trusted core 110 and a non-trusted core 120. Trusted core 110 is a part of a trusted world, and non-trusted core 120 is a part of a non-trusted world. Trusted core 110 and non-trusted core 120 are logically independent for security purposes.

Processor 100 can perform execution in trusted core 110, which can be a part of the trusted world. In this case, processor 100 is in a trusted execution environment and can access a trusted resource 112. Trusted resource 112 can be unique to trusted core 110. Processor 100 can also perform execution in non-trusted core 120, which can be a part of the non-trusted world. In this case, processor 100 is in a non-trusted execution environment and can access a non-trusted resource 122. Non-trusted resource 122 can be unique to non-trusted core 120.

Processor 100 can further include a common resource 130. Common resource 130 can be accessible in both the trusted world and the non-trusted world. According to some embodiments of the present disclosure, common resource 130 can include a variety of registers. In some embodiments, common resource 130 may not include security information. Common resource 130 can load different content according to whether processor 100 is in the trusted execution environment or the non-trusted execution environment.

In some embodiments, common resource 130 can include a general-purpose register GPR 132. General-purpose register GRP 132 can be generally configured to transmit data and temporarily store data. General-purpose register GRP 132 can also participate in logic operations (e.g., arithmetic logic operations) and store operation results from the logic operations. Since a register can be accessed faster than a memory, a plurality of general-purpose registers may be designed in the modern processor architecture to accelerate the execution speed of the processor (e.g., processor 100).

In some embodiments, common resource 130 can further include a vector general-purpose register VGPR 134. Similar to the functions of general-purpose register GPR 132, vector general-purpose register VGPR 134 can also be a register configured to transmit data and temporarily store data. In some embodiments, vector general-purpose register can participate in logic operations (e.g., arithmetic logic operations). In some embodiments, vector general-purpose register VGPR 134 may have more digits than general-purpose register GPR 134 does. In some embodiments, vector general-purpose register can be configured to be more efficient for floating point operations in a vector arithmetic unit VDSP or a floating-point arithmetic unit FPU.

In some embodiments, common resource 130 can further include a control register CR 136. Control register CR 136 can control and determine an operating mode of the processor (e.g., processor 110). In some embodiments, control register CR 136 can set system operation functions, I/O control, etc. In some embodiments, control register CR 136 in common resource 130 can generally be a register that does not include security information. A control register CR that includes security information can be set separately for trusted core 110 and non-trusted core 120. For example, a trusted control register CR 112 can be set in trusted core 110, and a non-trusted control register CR 122 can be set in the non-trusted core 120.

In some embodiments, in order to support the switching between the trusted world and the non-trusted world, processor 100 can further include a trusted program status register T_PSR 114 and a non-trusted program status register NT_PSR 124. In some embodiments, trusted program status register T_PSR can be located in trusted core 110. In some embodiments, non-trusted program status register NT_PSR 124 can be located in non-trusted core 120. In some embodiments, the two registers have basically the same results, and provide access in the same logical way. For example, both registers can provide access under the name of a program status register PSR. For example, when processor 100 is operating in the trusted execution environment or trusted world and instructions in processor 100 access program status register PSR, the instructions can access trusted program status register T_PSR 114. When processor 100 is operating in the non-trusted execution environment or non-trusted world and instructions in the processor 100 access a PSR, the instructions can access non-trusted program status register NT_PSR 124.

In some embodiments, trusted program status register T_PSR 114 and non-trusted program status register NT_PSR 124 can each have an execution environment indicator bit T. In some embodiments, T is one bit in the register. When a value of T is 1, it indicates that processor 100 is currently in the trusted execution environment or the trusted world. When the value of T is 0, it indicates that processor 100 is currently in the non-trusted execution environment or the non-trusted world. Therefore, in some embodiments, the bit T of trusted program status register T_PSR 114 can have a fixed value of 1, and the bit T of non-trusted program status register NT_PSR 124 can have a fixed value of 0. In some embodiments, processor 100 can be configured to switch between worlds by modifying the value of the bit T of program status register PSR.

In some embodiments, processor 100 can further include a security flag bit (not shown in FIG. 1) of the common resource. The security flag bit can be used for indicating the world to which the common resource currently belongs. The security flag bit of the common resource can be recorded in a number of different ways.

In some embodiments, trusted core 110 can further include a trusted processor configuration register T_PCR 116. Trusted processor configuration register T_PCR 116 can include an STV bit. The STV bit can be configured as a security flag bit of the common resource, which can indicate the world to which the common resource belongs. When a value of the STV bit is 1, it indicates that the common resource belongs to the trusted world. When the value of the STV bit is 0, it indicates that the common resource belongs to the non-trusted world.

In some embodiments, the security flag bit of the common resource can be implemented using a common resource stack-push flag bit in another register. For example, when a value of the common resource stack-push flag bit is 1, it indicates that the common resource has been pushed to a stack by the trusted world, so that the common resource can be used in the non-trusted world without a need to trigger stack push operations in the trusted world. In other words, the STV value of the trusted processor configuration register T_PCR 116 is set to 0. Similarly, when the common resource stack-push flag bit is 1, it means that the common resource has been pushed to a stack or initialized by the non-trusted world, and thus the common resource can be used in the trusted world without the need to trigger the stack push operation in the non-trusted world.

In some embodiments, processor 100 can further include a trusted entry base register T_EBR 118 in trusted core 110 and a non-trusted entry base register NT_EBR 128 in non-trusted core 120. A base address of an entry position of a storage space in the trusted world can be stored in trusted entry base register T_EBR 118. Similarly, a base address of an entry position of a storage space in the non-trusted world can be stored in non-trusted entry base register NT_EBR 128.

In some embodiments, the storage spaces of the trusted and non-trusted worlds each can be implemented as a stack. Therefore, base addresses of a trusted stack and a non-trusted stack can be stored in the trusted and non-trusted entry base registers respectively. Contents in common resource 130 can be stored in the corresponding stack according to the world to which the site of the common resource belongs. When the site of the common resource belongs to the trusted world, the content of the common resource can be pushed onto the trusted stack according to the base address of the trusted stack in trusted entry base register T_EBR 118 if the content of the common resource is to be stored. Similarly, when the site of the common resource belongs to the non-trusted world, the content of the common resource can be pushed onto the non-trusted stack according to the base address of the non-trusted stack in non-trusted entry base register NT_EBR 118 if the content of the common resource is to be stored. In addition, when the processor 100 is in the trusted execution environment, the content of the common resource used in the trusted world can be fetched by popping the stack with the base address of the trusted stack stored in trusted entry base register T_EBR 118. Similarly, when processor 100 is in the non-trusted execution environment, the content of the common resource used in the non-trusted world can be fetched by popping the stack with the base address of the non-trusted stack stored in non-trusted entry base register NT_EBR 128.

Figure 2:
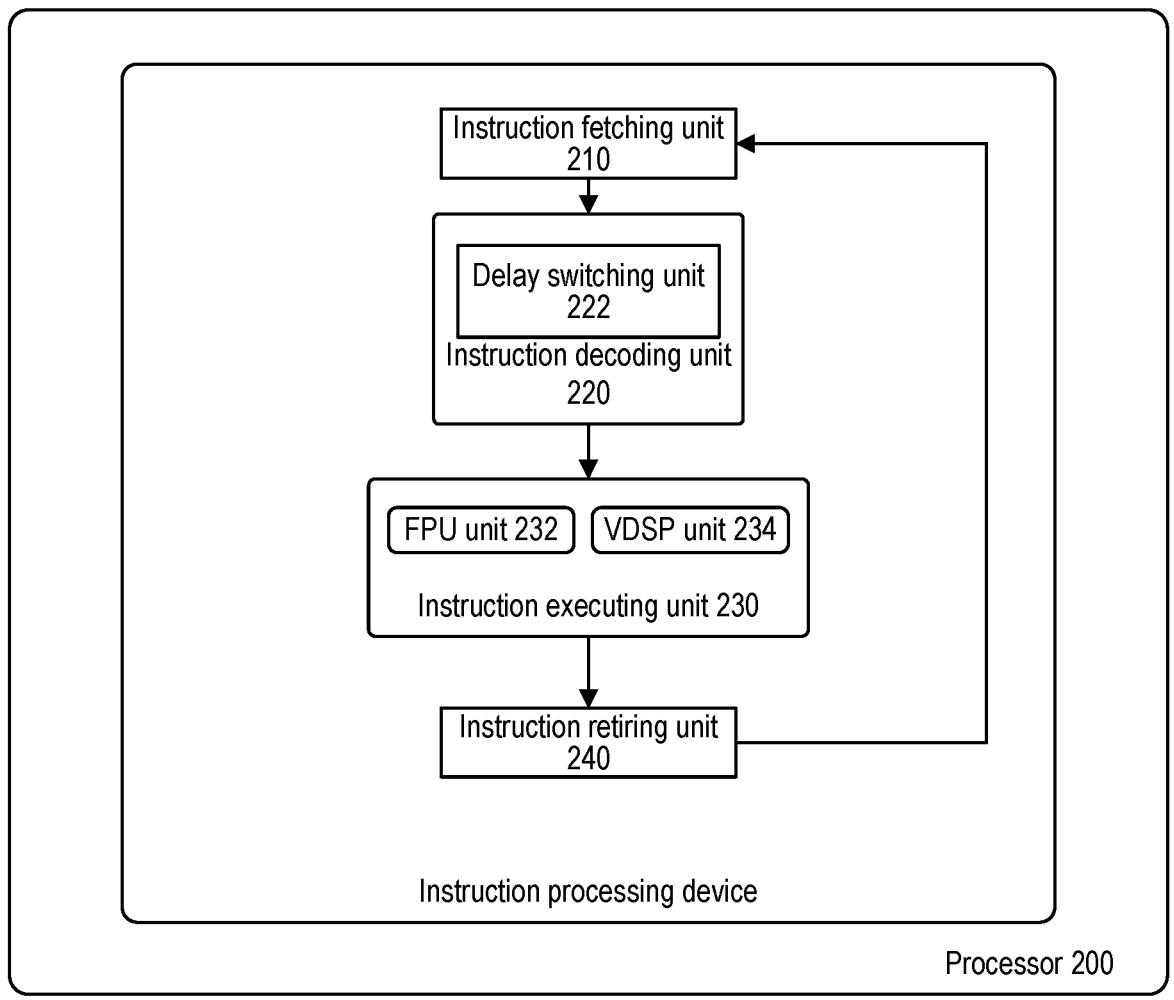
FIG. 2 is a schematic diagram of an example processor, according to some embodiments of the present disclosure.

FIG. 2 is a schematic diagram of an example processor, according to some embodiments of the present disclosure. As shown in FIG. 2, various components of a processor 200 can be configured for instruction execution. In some embodiments, processors 100 and 200 show different aspects of a processor. For example, FIG. 1 shows various components in trusted core 110 and non-trusted core 120 in a processor, whereas FIG. 2 shows various components for instruction execution for the processor.

As shown in FIG. 2, processor 200 includes an instruction processing device 290. Instruction processing device 290 can be an instruction processing component in processor 200. Instruction processing device 290 can be configured to fetch instructions for decoding and execute a variety of decoded instructions. In some embodiments, instruction processing device 290 can be a logical division of the functions of processor 200, and all instruction-related components in processor 200 can be classified as a part of instruction processing device 290 n.

In some embodiments, instruction processing device 290 can include an instruction fetching unit 210, an instruction decoding unit 220, an instruction executing unit 230, and an instruction retiring unit 240.

Instruction fetching unit 210 includes circuitry configured to fetch a to-be-executed instruction, and to send the fetched instruction to instruction decoding unit 220. The instruction can generally include an operation code and an address code. The operation code indicates an operation to be executed. The address code indicates an address or content of an operation object when the operation code is executed.

Instruction decoding unit 220 includes circuitry configured to decode and analyze an instruction to determine an operation code of the instruction. In some embodiments, instruction decoding unit 220 includes circuitry configured to further determine the nature and method of the operation. Instruction decoding unit 220 includes circuitry that is further configured to send the decoded instruction to instruction executing unit 230, where the instruction can be executed in instruction executing unit 230. In some embodiments, instruction executing unit 230 can include a variety of units that include circuitry configured to execute specialized instructions, such as an FPU unit 232. FPU unit 232 includes circuitry configured to execute a floating point instruction. Vector arithmetic unit VDSP 234 includes circuitry configured to execute a VDSP instruction. Embodiments of the present disclosure are not limited to specific forms of instruction executing units that execute the specialized instructions.

In some embodiments, processor 200 can further include an instruction retiring unit 240, so that processor 200 can process instructions in a pipelined manner. In some embodiments, after the execution of each instruction in instruction executing unit 230 is completed, the status of each instruction needs to be checked. For an instruction that has been executed and has no dependence on other instructions, the execution result of the instruction can be written back to the corresponding register and the instruction whose execution has been completed can be retired in the original order.

Instruction decoding unit 220 can include a delay switching unit 222. As described above, instruction decoding can be performed in instruction decoding unit 220, and instruction decoding unit 220 can determine whether the result from instruction decoding indicates that the to-be-executed instruction involves access to common resource 130 shown in FIG. 1. For example, the to-be-executed instruction involves access to the content in general-purpose register GPR 132 or vector general-purpose register VGPR 134.

In some embodiments, if the to-be-executed instruction does not involve the access to common resource 130, instruction decoding unit 220 can send the instruction to instruction executing unit 230 for execution. In some embodiments, if the instruction involves the access to common resource 130, delay switching unit 222 can determine whether a current execution environment of processor 100 is consistent with a resource status of the common resource.

As described above, processor 100 can be in the trusted execution environment (e.g., a trusted world) or the non-trusted execution environment (e.g., a non-trusted world). If the instruction is to access the common resource at this point, the site of the common resource or the content in the common resource should belong to the corresponding execution environment. Since processor 100 does not correspondingly switch the content in common resource 130 simultaneously when switching the world, inconsistency may occur between them.

In some embodiments, when the current execution environment of processor 100 is consistent with the resource status of the common resource, delay switching unit 222 does not perform resource switching but sends the instruction to instruction executing unit 230 for subsequent instruction execution. In some embodiments, when the current execution environment is inconsistent with the resource status of common resource 130, delay switching unit 220 switches the site of the common resource into the one consistent with the current execution environment. In other words, delay switching unit 220 can load the content corresponding to the current execution environment into the common resource, and then the instruction is sent to instruction executing unit 230 for subsequent instruction execution.

As such, through the operation in instruction decoding unit 220, or in delay switching unit 222, the consistency of instruction execution can be ensured while the delay of the switching of common resource 130 in the world switching is ensured.

As described above with reference to FIG. 1, bit T of program status register PSR in processor 100 can indicate the current execution environment, while the security flag bit of the common resource (e.g., an STV bit of a trusted processor configuration register T_PCR 116) can indicate the world to which the site of the common resource belongs. Delay switching unit 222 can compare a value of bit T of program status register PSR with a value of bit STV of trusted processor configuration register T_PCR 116 to determine whether the current execution environment is consistent with the site of common resource 130.

In some embodiments, when the current execution environment is inconsistent with the site of common resource 130, delay switching unit 222 can switch the site of the common resource in the following steps.

First, bit T of program status register PSR is modified to a value corresponding to bit STV of trusted processor configuration register T_PCR 116, thus triggering processor 100 to perform world switching to switch the current execution environment to an execution environment consistent with the site of the current common resource.

Then, content in common resource 130 is saved in the execution environment. In some embodiments, there is a corresponding entry base register (e.g., trusted entry base register T_EBR 118 or non-trusted entry base register NT_EBR 128) in each world (e.g., each core). A base address of a stack of the world can be fetched from the entry base register, and the content of common resource 130 can be pushed and saved by pushing to the stack. In this case, the value of bit STV of trusted processor configuration register T_PCR 116 can be modified to indicate that the site of the current common resource has been saved and the common resource can be used in other worlds.

Next, bit T of program status register PSR is modified back to a value corresponding to the original execution environment, so that processor 100 is triggered to perform world switching to switch back to the original execution environment, and the content of the common resource corresponding to the execution environment is retrieved in the execution environment. In addition, the content stored in the stack can be read to the common resource by popping the stack with reference to the stack base address stored in the entry base register in the execution environment, thereby restoring the site of the common resource.

In the steps above, the current execution environment has been consistent with the site of the common resource, and thus the instruction can be sent to instruction executing unit 230 for subsequent processing.

In some embodiments, the value of bit STV of trusted processor configuration register T_PCR 116 can be modified after processor 100 is switched back to the current execution environment.

As described above, in some embodiments, the inconsistency between the current execution environment and the site of the common resource can be caused by the processing during the world switching.

In some embodiments, world switching is executed in instruction retiring unit 240. Instruction retiring unit 240 can determine whether to perform world switching. For example, instruction retiring unit 240 can determine whether to switch the execution environment of processor 100. If the world switching is not performed, instruction retiring unit 240 can instruct instruction fetching unit 210 to fetch the next to-be-executed instruction after performing operation related to retiring an instruction. When it is determined to perform the world switching, a related status of the current execution environment can be stored. For example, some dedicated resource content in the execution environment is pushed to the stack. In some embodiments, the content can be saved by pushing to the stack with reference to the base addresses of the stacks stored in registers such as the various entry base registers (e.g., trusted entry base register T_EBR 118 or non-trusted entry base register NT_EBR 128). Then, the value of bit T of program status register PSR can be modified to trigger processor 100 to switch from the current execution environment to a target execution environment.

In some embodiments, the operation of saving the site of the common resource is not performed in the world switching operation of instruction retiring unit 240. Instead, the dedicated status of each execution environment is saved, thus reducing the time required by the site switching and accelerating the site switching speed.

In some embodiments, processor 100 is not limited to the specific range of the common resource. For example, general-purpose register GPR 132, vector general-purpose register VGPR 134 and control register CR 136 belong to common resources and may also be used frequently in the switched world, and thus content in the resources can be pushed and popped to and from the stack during world switching, and delay switching can be performed on common resources that may not be used frequently. The common resources on which delay switching is to be performed can be determined according to an application scenario of processor 200.

Figure 3:
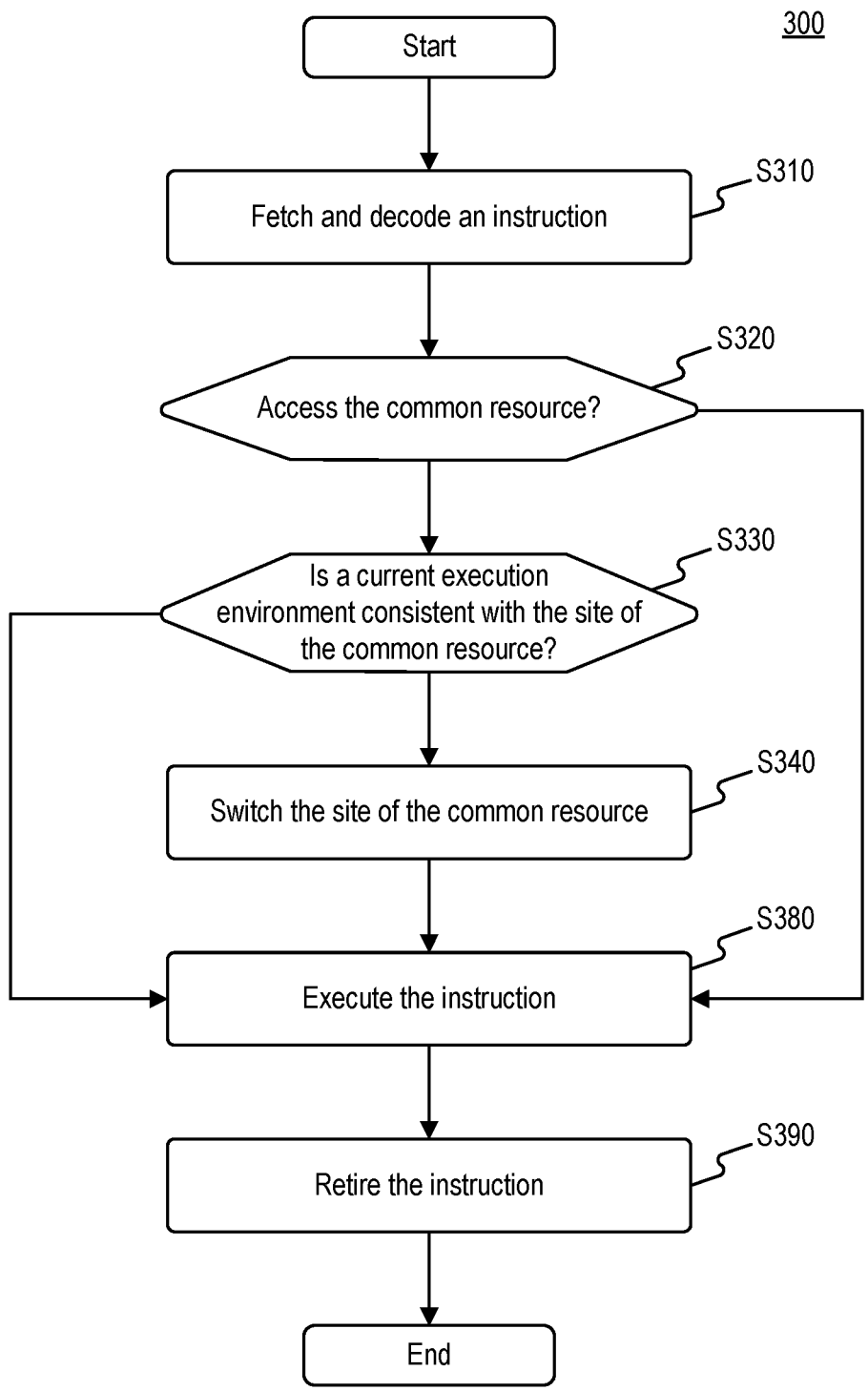
FIG. 3 is a flowchart of an example instruction execution method, according to embodiments of the present disclosure.

FIG. 3 is a flowchart of an example instruction execution method in a processor, according to some embodiments of the present disclosure. As shown in FIG. 3, an instruction execution method 300 can be performed in processors 100 of FIG. 1 or processor 200 of FIG. 2. It is appreciated that some steps in method 300 have been described in the steps of processors 100 and 200, and will not be repeated here.

Method 300 starts from step S310. In step S310, an instruction is fetched and decoded. This can be performed in instruction fetching unit 210 and instruction decoding unit 220 of FIG. 2. Then, in step S320, it is determined whether the result from instruction decoding in step S310 indicates that the instruction involves access to the common resource. If the determination result in step S320 indicates that the instruction involves access to the common resource, the instruction is sent to step S380 to execute the instruction. On the contrary, if the determination result in step S320 indicates that the instruction involves access to the common resource, method 300 proceeds to step S330.

In step S330, it is determined whether a current execution environment of the processor is consistent with the site of the common resource. In other words, it is determined whether the world to which the content in the common resource belongs is consistent with the current world. In some embodiments, the implementation of making the above determination has been described above with reference to FIG. 2.

When the determination result in step S330 indicates that the current execution environment is consistent with the site of the common resource, method 300 proceeds to step S380 to execute the instruction. On the contrary, when the determination result in step S330 indicates that the current execution environment is inconsistent with the site of the common resource, method 300 proceeds to step S340.

In step S340, the site of the common resource is restored to be consistent with the current execution environment or the current world. In other words, the content of the common resource corresponding to the current execution environment is loaded into the common resource. In some embodiments, the specific implementation of switching the common resource has been described above with reference to FIG. 2.

In some embodiments, after the current execution environment is set to be consistent with the site of the common resource in step S340, the method proceeds to step S380 to execute the instruction.

In some embodiments, after the execution of the instruction in step S380 is completed, the instruction can be retired in step S390. It is further determined in step S390 whether the instruction involves world switching. If the instruction involves the world switching, the status of the current execution environment is saved and the world switching is performed, but the site of the common resource is not switched during the world switching, so as to accelerate the world switching speed. In some embodiments, the specific implementation of performing the world switching has been described above with reference to FIG. 3.

In some embodiments, after the execution of step 390, method 300 goes back to step S310 to fetch a next instruction for processing, thus repeating the various steps in method 300 above.

Figure 4:
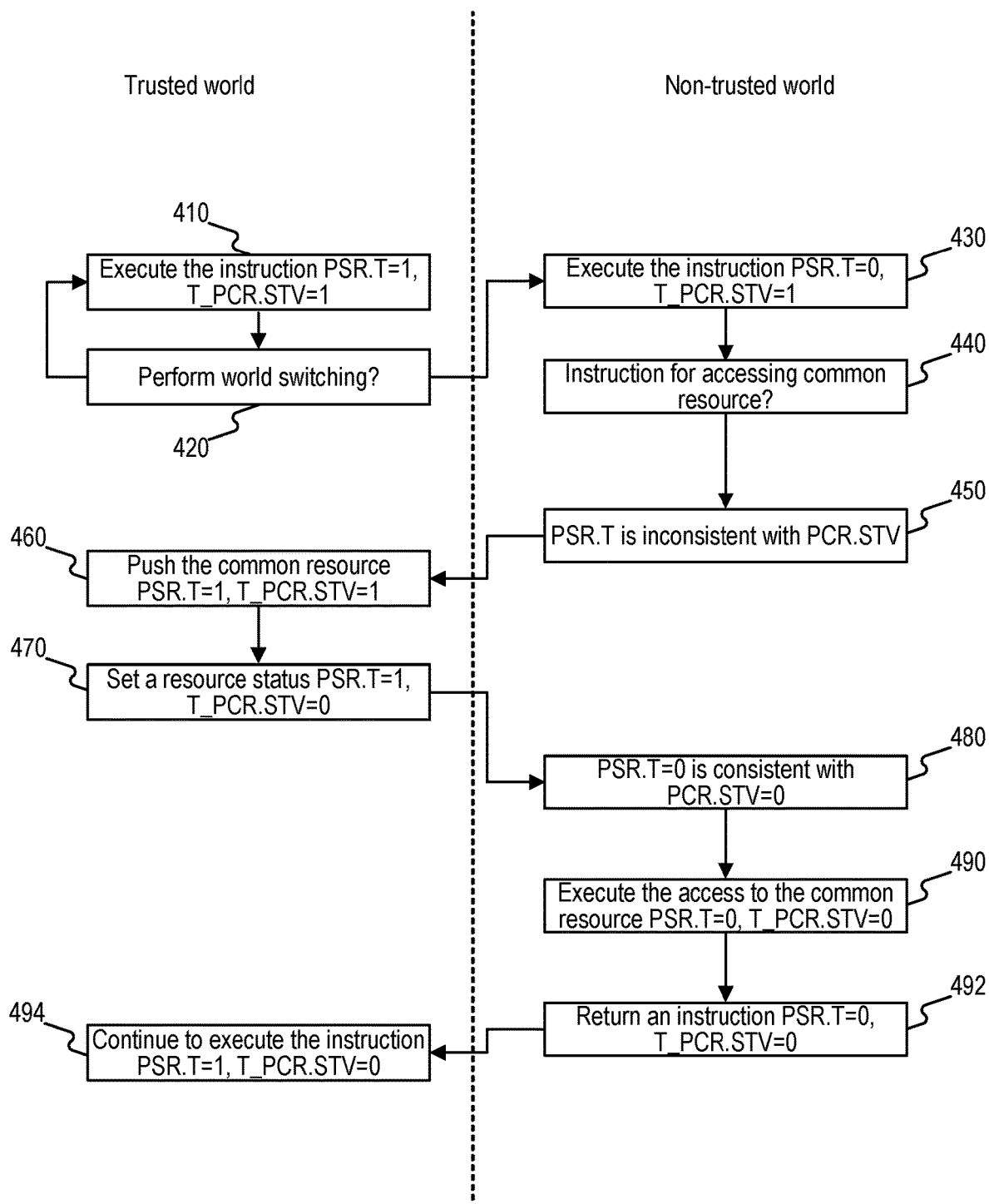
FIG. 4 is a flowchart of an example instruction execution process, according to some embodiment of the present disclosure.

FIG. 4 is a flowchart of an example instruction execution process 400, according to some embodiments of the present disclosure. Various status changes during instruction execution are described in FIG. 4 by taking that an instruction of processor 100 is executed in a trusted execution environment (e.g., trusted world) and switched to a non-trusted execution environment (e.g., non-trusted world) for execution as an example.

In a status 410, the instruction is executed in the trusted world. In this case, program status register PSR is the trusted program status register T_PSR 114, in which the value of the bit T is 1. In the initial status, the value of the STV bit in trusted processor configuration register T_PCR 116 is also equal to 1, indicating that the site of the common resource at this time is in the trusted world.

Then, in a status 420, it is determined whether world switching is sent during the execution of the instruction. If the world switching is not performed, the process returns to status 410 to execute a new instruction.

If the world switching is performed, processor 100 is switched to the non-trusted world, and the process enters a status 430 where the instruction is executed in the non-trusted world. In status 430, program status register PSR is NT_PSR 124, and the value of the T bit is set to 0. The site of the common resource is not switched, and thus the value of the STV bit in trusted processor configuration register T_PCR 116 is still 1.

In a status 440, it is determined that the execution of the instruction involves access to the common resource. In status 450, it is determined that the value 0 of the T bit of non-trusted program status register NT_PSR 124 is inconsistent with the value 1 of the trusted program configuration register T_PCR 116, and thus the world switching is triggered. The process enters a status 460.

In status 460, it is in the trusted world, trusted program status register T_PSR 114 is used, the value of the bit T of trusted program status register T_PSR 114 is 1, and the site of the common resource is pushed. Then, in a status 470, the value of the STV bit of trusted program configuration register T_PCR 116 is set to 0 after the site of the common resource is pushed, and the world switching is triggered once again.

In status 480, it is in the non-trusted world, non-trusted program status register NT_PSR 124 is used, and the value of the bit T of non-trusted program status register NT_PSR 124 is 0. In this case, the value of the STV bit of trusted program configuration register T_PCR 116 is set to 0, and the two values are consistent with each other.

Therefore, in a status 490, the execution involves access to the common resource. Also in a status 492, a world switching instruction is executed so that the process returns to a status 494 in the trusted world. In status 494, the value of trusted program status register T_PSR 114 is 1, but the site of the common resource is not switched, and thus the value of the STV bit of the T_PCR 116 remains 0. The process can then return to status 410 to continue to execute a new instruction in the trusted world.

According to the instruction execution solution of the present disclosure, the site of the common resource may not be switched immediately during world switching. After the world switching is completed, the common resource is switched only when it is found during execution of an instruction in the new world that the instruction involves access to the common resource. As a result, unnecessary stack pushing and popping operations on the common resource can be reduced, and the speed of the world switching is increased.

The various example embodiments described herein are described in the general context of method steps or processes, which may be implemented in one aspect by a computer program product, embodied in a computer-readable medium, including computer-executable instructions, such as program code, executed by computers to program the processors (e.g., processor 100 and processor 200). A computer-readable medium may include removeable and nonremovable storage devices including, but not limited to, Read Only Memory, Random Access Memory, compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. A processor comprising:
  a trusted execution environment;
  a non-trusted execution environment;
  a common resource accessible in both the trusted execution environment and the non-trusted execution environment; and an instruction processing device having circuitry configured to:
fetch an instruction for decoding,
determine consistency between a current execution environment of the processor and a resource status in response to a result from decoding the instruction indicating that the instruction involves access to the common resource, and
load content corresponding to the current execution environment into the common resource if it is determined that the current execution environment is inconsistent with the resource status, wherein the resource status indicates an execution environment corresponding to content in the common resource.

2. The processor of claim 1, wherein the instruction processing device includes circuitry further configured to execute the decoded instruction.

3. The processor of claim 1, wherein:
in response to the current execution environment being inconsistent with the resource status, the instruction processing device includes circuitry further configured to:
switch the execution environment of the processor from the current execution environment to a first execution environment corresponding to the resource status;
store the content in the common resource using a storage space in the first execution environment;
switch the execution environment of the processor from the first execution environment back to the current execution environment;
load content from a storage space in the current execution environment into the common resource; and
set the resource status to indicate the current execution environment.

4. The processor of claim 1, wherein the instruction processing device comprises:
an instruction fetching unit having circuitry configured to fetch an instruction;
an instruction decoding unit having circuitry configured to decode the fetched instruction; and
an instruction executing unit having circuitry configured to execute the decoded instruction.

5. The processor of claim 4, wherein the instruction processing device further comprises:
an instruction retiring unit having circuitry configured to:
store status information of the current execution environment in a storage space in the current execution environment in response to the instruction involving execution environment switching of the processor from the current execution environment to a target execution environment; and
set the current execution environment as the target execution environment, so that the execution environment of the processor is switched from the current execution environment to the target execution environment.

6. The processor of claim 1, further comprising:
a program status register, comprising an execution environment bit that indicates the current execution environment of the processor, wherein a value of the execution environment bit of the program status register is changed to instruct the processor to switch the execution environment.

7. The processor of claim 6, wherein the program status register further comprises:
a trusted program status register; and
a non-trusted program status register,
wherein the trusted program status register is used as the program status register in response to the processor being in the trusted execution environment; and the non-trusted program status register is used as the program status register in response to the processor being in the non-trusted execution environment.

8. The processor of claim 6, wherein:
the processor further comprises a configuration register comprising a resource status bit indicating the execution environment corresponding to the content of the common resource, and
the instruction processing device includes circuitry that is further configured to determine, based on the value of the execution environment bit of the program status register and a value of the resource status bit of the configuration register, whether the current execution environment is consistent with the resource status.

9. The processor of claim 1, further comprising:
a trusted entry base register configured to store a base address of a stack in the trusted execution environment, wherein the stack in the trusted execution environment is configured to store common resource content corresponding to the trusted execution environment; and
a non-trusted entry base register configured to store a base address of a stack in the non-trusted execution environment, wherein the stack in the non-trusted execution environment is configured to store common resource content corresponding to the non-trusted execution environment,
wherein the instruction processing device includes circuitry that is further configured to store and load the common resource content by referring to the base address of the stack stored in the trusted entry base register in response to the processor being in the trusted execution environment, and store and load the common resource content by referring to the base address of the stack stored in the non-trusted entry base register in response to the processor being in the non-trusted execution environment.

10. The processor of claim 1, wherein the common resource comprises a common register resource that comprises one or more of the following:
a general-purpose register;
a vector general-purpose register; and
a control register.

11. The processor of claim 1, wherein the instruction processing device includes circuitry that is configured to execute the decoded instruction in response to a determination that the current execution environment is consistent with the resource status.

12. An instruction execution method in a processor comprising a trusted execution environment, a non-trusted execution environment, and a common resource accessible in both the trusted execution environment and the non-trusted execution environment, the method comprising:
fetching an instruction for decoding;
determining consistency between a current execution environment of the processor and a resource status in response to a result from instruction decoding indicating that the instruction involves access to the common resource, wherein the resource status indicates an execution environment corresponding to content in the common resource; and
loading content corresponding to the current execution environment into the common resource in response to a determination that the current execution environment is inconsistent with the resource status.

13. The method of claim 12, further comprising:
executing the decoded instruction.

14. The method of claim 12, wherein loading content corresponding to the current execution environment into the common resource further comprises:
switching the execution environment of the processor from the current execution environment to a first execution environment corresponding to the resource status;
storing the content in the common resource using a storage space in the first execution environment;
switching the execution environment of the processor from the first execution environment back to the current execution environment;
loading content from a storage space in the current execution environment into the common resource; and
setting the resource status to the current execution environment.

15. The method of claim 12, wherein in response to the instruction involving execution environment switching from the current execution environment to a target execution environment, after executing the instruction, the method further comprises:
storing status information of the current execution environment in the storage space of the current execution environment;
setting the current execution environment as the target execution environment; and
switching the execution environment of the processor from the current execution environment to the target execution environment.

16. The method of claim 12, wherein the processor further comprises a program status register having an execution environment bit indicating the current execution environment of the processor, and switching the execution environment of the processor further comprises:
modifying the execution environment bit of the program status register.

17. The method of claim 16, wherein the processor further comprises a configuration register having a resource status bit that indicates the execution environment corresponding to the content of the common resource, and determining whether the current execution environment of the processor is consistent with the resource status further comprises:
determining whether a value of the execution environment bit of the program status register is consistent with a value of the resource status bit of the configuration register.

18. The method of claim 12, wherein the processor further comprises entry base registers corresponding to various execution environments, and positions of the storage spaces in the various execution environments are determined according to values in the entry base registers.

19. The method of claim 12, wherein the common resource further comprises a common register resource comprising one or more of:
a general-purpose register;
a vector general-purpose register; and
a control register.

20. A non-transitory computer readable medium that stores a set of instructions that is executable by one or more processors of an apparatus to cause the apparatus to initiate an instruction execution method in a processor comprising a trusted execution environment, a non-trusted execution environment, and a common resource accessible in both the trusted execution environment and the non-trusted execution environment, the method comprising:
fetching an instruction;
determining consistency between a current execution environment of the processor and a resource status in response to a result from instruction decoding indicating that the instruction involves access to the common resource, wherein the resource status indicates an execution environment corresponding to content in the common resource; and
loading content corresponding to the current execution environment into the common resource in response to a determination that the current execution environment is inconsistent with the resource status.

21. The non-transitory computer readable medium of claim 20, wherein loading content corresponding to the current execution environment into the common resource further comprises:
switching the execution environment of the processor from the current execution environment to a first execution environment corresponding to the resource status;
storing the content in the common resource using a storage space in the first execution environment;
switching the execution environment of the processor from the first execution environment back to the current execution environment;
loading content from a storage space in the current execution environment into the common resource; and
setting the resource status to the current execution environment.

22. The non-transitory computer readable medium of claim 20, wherein in response to the instruction involving execution environment switching from the current execution environment to a target execution environment, after executing the instruction, the method further comprises:
storing status information of the current execution environment in the storage space of the current execution environment;
setting the current execution environment as the target execution environment; and
switching the execution environment of the processor from the current execution environment to the target execution environment.

23. The non-transitory computer readable medium of claim 20, wherein the processor further comprises a program status register having an execution environment bit indicating the current execution environment of the processor, and switching the execution environment of the processor further comprises:
modifying the execution environment bit of the program status register.

24. The non-transitory computer readable medium of claim 23, wherein the processor further comprises a configuration register having a resource status bit that indicates the execution environment corresponding to the content of the common resource, and determining whether the current execution environment of the processor is consistent with the resource status further comprises:
determining whether a value of the execution environment bit of the program status register is consistent with a value of the resource status bit of the configuration register.

25. The non-transitory computer readable medium of claim 20, wherein the processor further comprises entry base registers corresponding to various execution environments, and positions of the storage spaces in the various execution environments are determined according to values in the entry base registers.

26. The non-transitory computer readable medium of claim 20, wherein the common resource further comprises a common register resource comprising one or more of:
- a general-purpose register;
- a vector general-purpose register; and
- a control register.

27. The non-transitory computer readable medium of claim 20, wherein the set of instructions that is executable by one or more processors of the apparatus to cause the apparatus to further perform:
- executing the instruction directly in response to a determination that the current execution environment is consistent with the resource status.

28. The non-transitory computer readable medium of claim 20, wherein loading content corresponding to the current execution environment into the common resource further comprises:
- switching the common resource to be consistent with the current execution environment.

* * * * *